(12) United States Patent
Hall et al.

(10) Patent No.: US 11,614,325 B2
(45) Date of Patent: Mar. 28, 2023

(54) TELESCOPING LEVEL DEVICE

(71) Applicants: Andrew S. Hall, Ponte Vedra Beach, FL (US); Robert E. Hall, Jacksonville, FL (US)

(72) Inventors: Andrew S. Hall, Ponte Vedra Beach, FL (US); Robert E. Hall, Jacksonville, FL (US)

( * ) Notice: Subject to any disclaimer, the term of this patent is extended or adjusted under 35 U.S.C. 154(b) by 0 days.

(21) Appl. No.: 17/078,164

(22) Filed: Oct. 23, 2020

(65) Prior Publication Data
US 2022/0128356 A1  Apr. 28, 2022

(51) Int. Cl.
*G01C 9/02* (2006.01)
*G01C 9/26* (2006.01)

(52) U.S. Cl.
CPC ............... *G01C 9/02* (2013.01); *G01C 9/26* (2013.01)

(58) Field of Classification Search
CPC .................................. G01C 9/02; G01C 9/26
USPC ........................................................... 33/300
See application file for complete search history.

(56) References Cited

U.S. PATENT DOCUMENTS

| | | | | |
|---|---|---|---|---|
| 4,333,244 A | * | 6/1982 | Bailey | G01C 5/00 33/290 |
| 4,435,908 A | * | 3/1984 | Semler, Jr. | G01C 9/28 33/376 |
| 4,458,425 A | | 7/1984 | Hester | |
| 5,001,839 A | * | 3/1991 | Jones | E04G 21/18 33/408 |
| 5,038,493 A | * | 8/1991 | Stabs | G01B 5/061 33/809 |
| 5,167,075 A | | 12/1992 | Weldy et al. | |
| 5,249,365 A | * | 10/1993 | Santiago | G01C 9/28 33/451 |
| 6,041,510 A | * | 3/2000 | Huff | G01C 9/26 33/381 |
| 6,047,478 A | * | 4/2000 | Sowers | G01C 9/26 33/379 |
| 6,279,240 B1 | * | 8/2001 | Bonaventura, Jr. | G01C 9/26 33/375 |
| 6,694,632 B1 | * | 2/2004 | Schooley | G01C 9/28 33/375 |
| 7,497,022 B1 | * | 3/2009 | Aarhus | G01C 9/26 33/376 |
| 7,520,066 B2 | * | 4/2009 | Richins | G01C 9/18 33/478 |
| 7,707,737 B2 | * | 5/2010 | Lightfoot | G01B 3/1084 33/700 |
| 7,832,113 B1 | * | 11/2010 | Richins | G01C 9/18 33/478 |
| 8,230,609 B1 | | 7/2012 | Sanders et al. | |
| 9,933,259 B1 | * | 4/2018 | Vargas | G01C 9/26 |
| 11,415,413 B2 | * | 8/2022 | Cook | G01C 9/34 |

(Continued)

*Primary Examiner* — Yaritza Guadalupe-McCall
(74) *Attorney, Agent, or Firm* — . Marks Gray, P.A.; Mitchell Ghancie; Christopher Roberts

(57) ABSTRACT

This unique and novel invention provides a telescoping level device used to effectively and efficiently measure the slope of objects and surfaces. The device comprises a telescoping arm, a ball joint, a level, and one or more contactors. The device allows the user to easily, accurately, and quickly verify the in-situ slope of pipes as well as a plurality of other objects and surfaces. The length and angle of the telescoping arm, relative to the level, are adjustable to prevent the user from unnecessarily stooping, kneeling, or climbing.

12 Claims, 12 Drawing Sheets

(56) References Cited

U.S. PATENT DOCUMENTS

| | | | |
|---|---|---|---|
| 2006/0283030 A1 | 12/2006 | Lee | |
| 2009/0056154 A1* | 3/2009 | Richins | G01C 9/18 33/374 |
| 2012/0174422 A1* | 7/2012 | Heyer | G01C 9/00 33/501.08 |
| 2013/0340267 A1* | 12/2013 | Carbajal | G01C 15/10 33/286 |
| 2018/0021939 A1* | 1/2018 | Illingworth | B25H 7/02 33/354 |
| 2022/0128356 A1* | 4/2022 | Hall | G01C 9/02 |

* cited by examiner

TELESCOPING LEVEL DEVICE

BACKGROUND OF THE INVENTION

A. Field of the Invention

This invention relates to a telescoping level used within the construction industry to determine the slope of various objects and surfaces.

B. Prior Art

Construction tolerances for the slope of a variety of objects and surfaces, including pipes as well as other non-structural and structural elements, require precise installation. It is well known that water pipes which utilize gravity to provide adequate flow rates require precise layout to ensure that proper slope is achieved. The consequences of improperly sloped objects or surfaces can cause unnecessary delays and costs to a construction project. Accordingly, the construction industry often utilizes inspectors to ensure such objects and surfaces provide the prescribed tolerances set forth within the governing building code.

However, inspections are often cumbersome and unnecessarily dangerous for the inspector due to the repetitive stooping, kneeling, and climbing, which is often required. While there has been much innovation within the construction industry, the process of measuring the slope of in-situ installations during described device, is a handheld device that allows a user to stand in an upright position, without having to unnecessarily stoop, kneel, or climb, to repetitively, consistently, and accurately measure the level of an object or surface.

BRIEF SUMMARY OF THE INVENTION

The present invention provides a telescoping level device used within the construction industry for measuring the slope of drainpipes as well as other objects and surfaces. This device comprises a telescoping arm, a ball joint, a level and one or more contactors. The telescoping arm further provides a handle for ease of use and an adjustable light source for use in dark areas. The telescoping arm is further comprised of multiple sections and has a length that may vary by a pre-determined range. The ball joint allows the telescoping arm to articulate, relative to the level, and thereby accommodate a variety of inclinations and uses which prevent the user from unnecessarily stooping, kneeling, or climbing on ladders or the like to reach the object or surface that is intended to be measured. The articulation of the telescoping arm also allows for the device to transform into a compact configuration suitable for storing the device when it is not being used.

To provide precise and accurate measurements, the presently described embodiments of the invention includes a first exemplary embodiment, a second exemplary embodiment and a third exemplary embodiment. Each embodiment respectively relates to an alternative form of one or more contactors. The one or more contactors for the first exemplary embodiment are comprised of one or more flat shims, which are provided on the bottom side of the level. The second exemplary embodiment is comprised of one or more pipe saddles, which are provided on the bottom side of the level. The third exemplary embodiment is comprised of one or more contactors attached to one or more L-brackets. The L-brackets comprise two legs; a horizontal leg and a vertical leg. The third exemplary embodiment enables the user of the device to more readily observe the contactors to ensure proper contact is being made with the object or surface that is being measured.

The level preferably comprises a spirit level that is attached to the ball joint. However, it is anticipated that other types of levels may be used, and such levels may be larger or smaller than the level described herein without departing from the spirit of the invention. Accordingly, the device is designed such that the level may be interchangeable and can be detached from the telescoping arm, to accommodate the measurement of the slope of a variety of objects and surfaces.

Moreover, the disclosure of this design may readily be utilized as a basis for the design of other similar devices to achieve the same results.

NUMBERING REFERENCE

5—Telescoping level device
10—Telescoping arm
11—Top section
11a—Handle
12—Intermediate section
13—Bottom section
14—Adjustable light source
15—Ball joint
16—Ball joint lever
20—Level
25—Shim
50—Pipe
105—Second exemplary embodiment 125—Pipe saddle
205—Third exemplary embodiment
221—L-bracket

DETAILED DESCRIPTION OF THE EMBODIMENTS

The present invention provides a telescoping level device 5 (hereinafter "device" 5) used within the construction industry for effectively and efficiently determining the slope of a variety of objects and surfaces.

Figure 6:
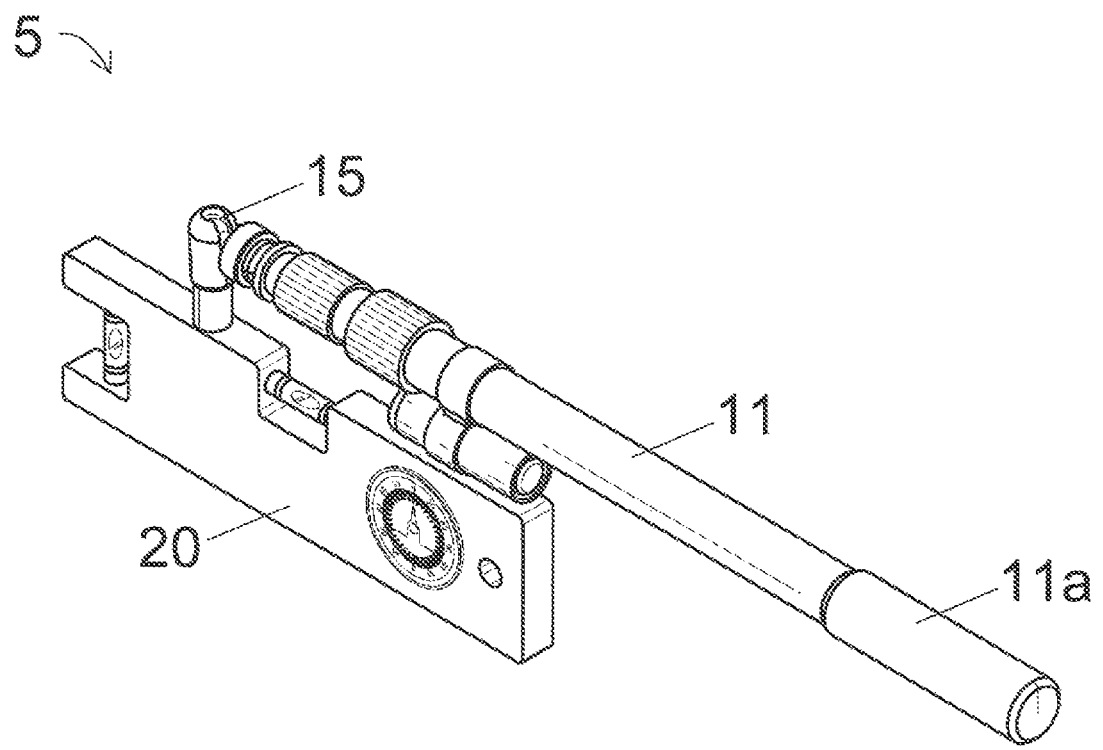
FIG. 6 is a rear isometric view of the first exemplary embodiment of the telescoping level device in its compacted configuration.
Figure 7:
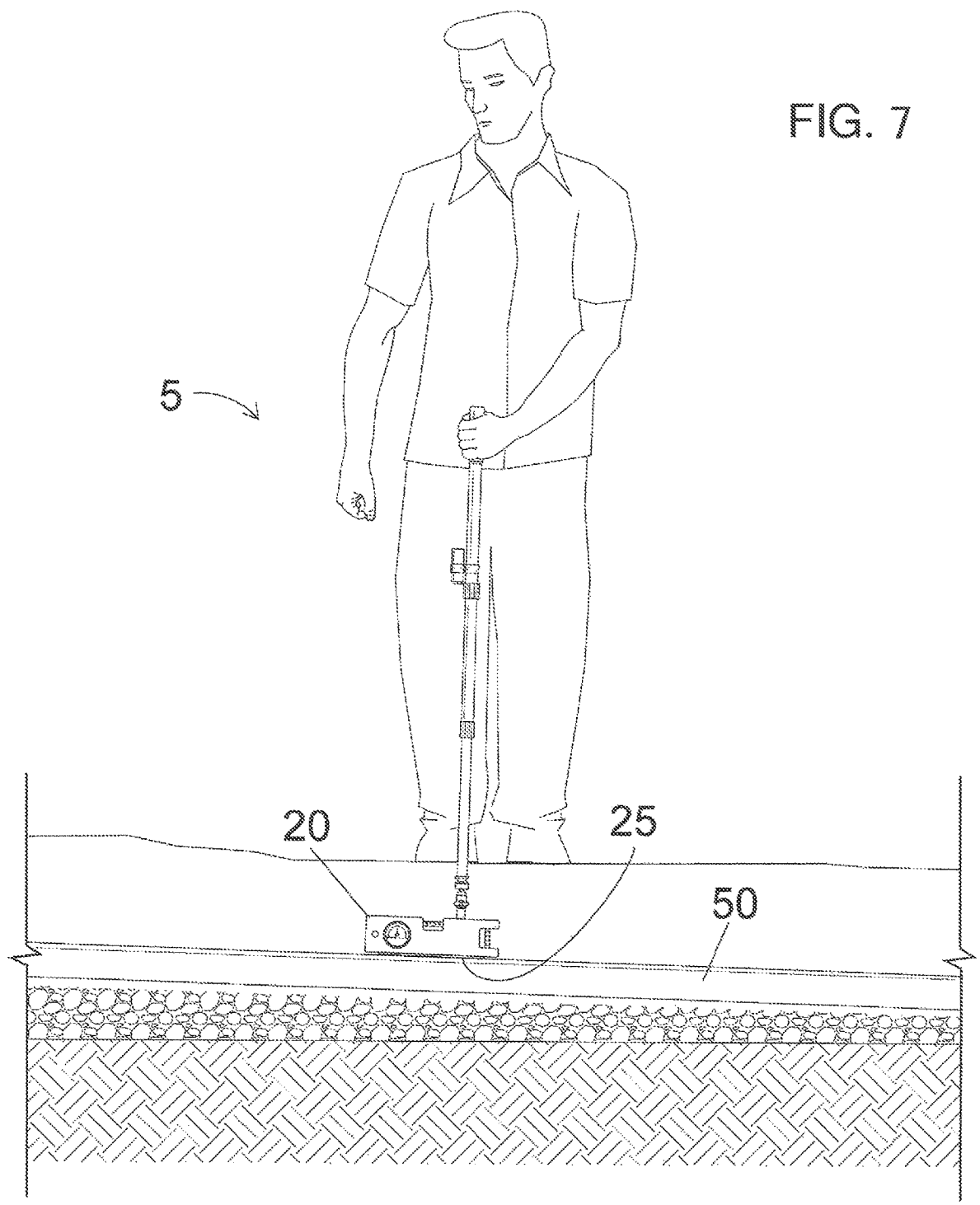
FIG. 7 is a first side in-use view of the first embodiment of the telescoping level device measuring the slope of a drainpipe below grade.
Figure 8:
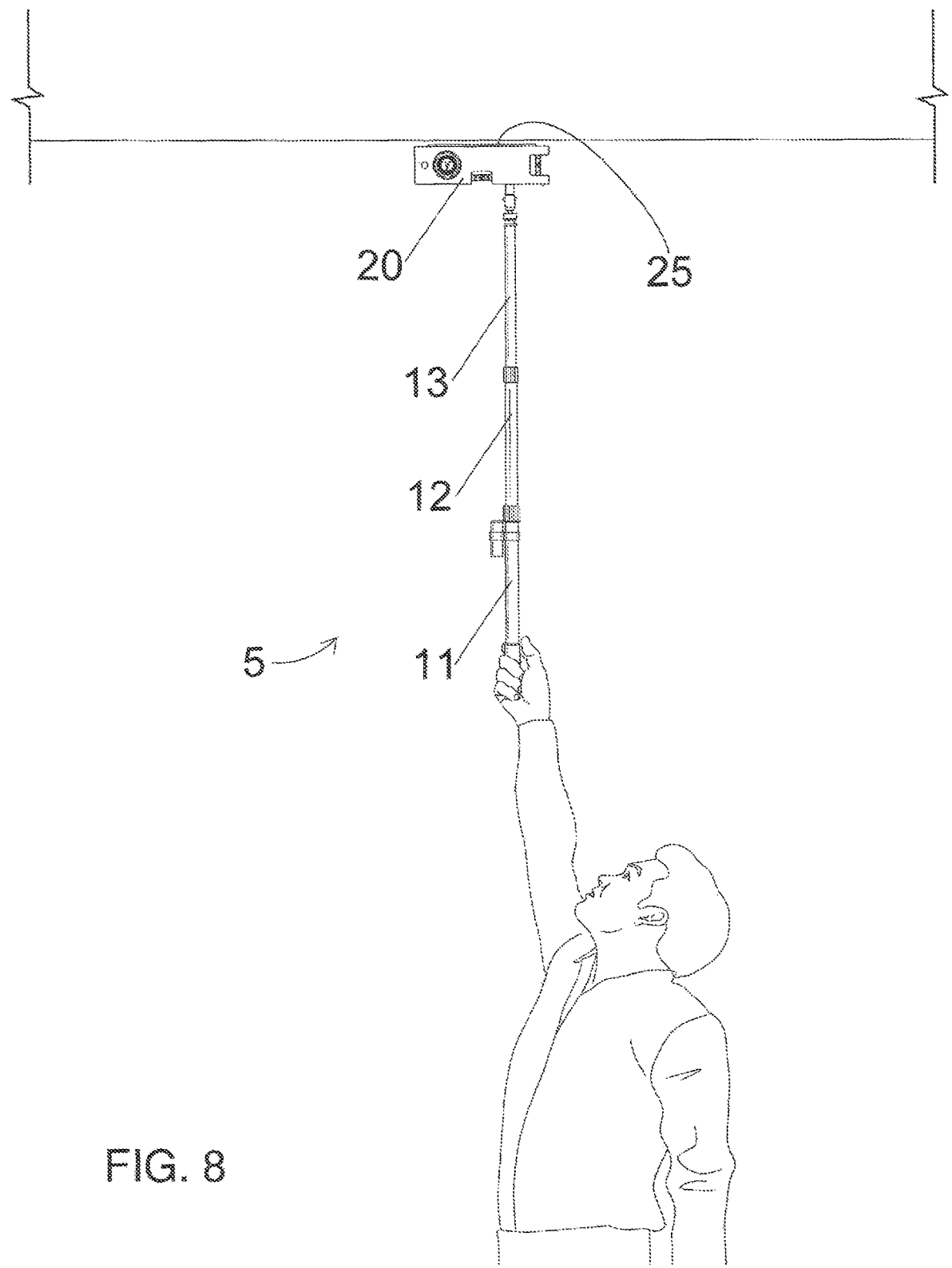
FIG. 8 is a second side in-use view of the first exemplary embodiment of the telescoping level device measuring the slope of an overhead surface.

The device comprises a telescoping arm 10, a ball joint 15, a level 20, and one or more contactors. The telescoping arm 10 comprises a top section 11, one or more intermediate sections 12, as well as a bottom section 13 and each section of the telescoping arm is constructed of a substantially semi-rigid or rigid material. Each section 11, 12, 13 has a top end and a bottom end. Moreover, each section 11, 12, 13 has the same cross-sectional shape. However, the top section 11 comprises the largest internal volume and can substantially envelop the other sections 12, 13 when the telescoping arm 10 is fully collapsed, as shown in FIG. 6. The intermediate section 12 has a greater internal volume than the bottom section 13 and can substantially envelop the bottom section 13.

Figure 1:
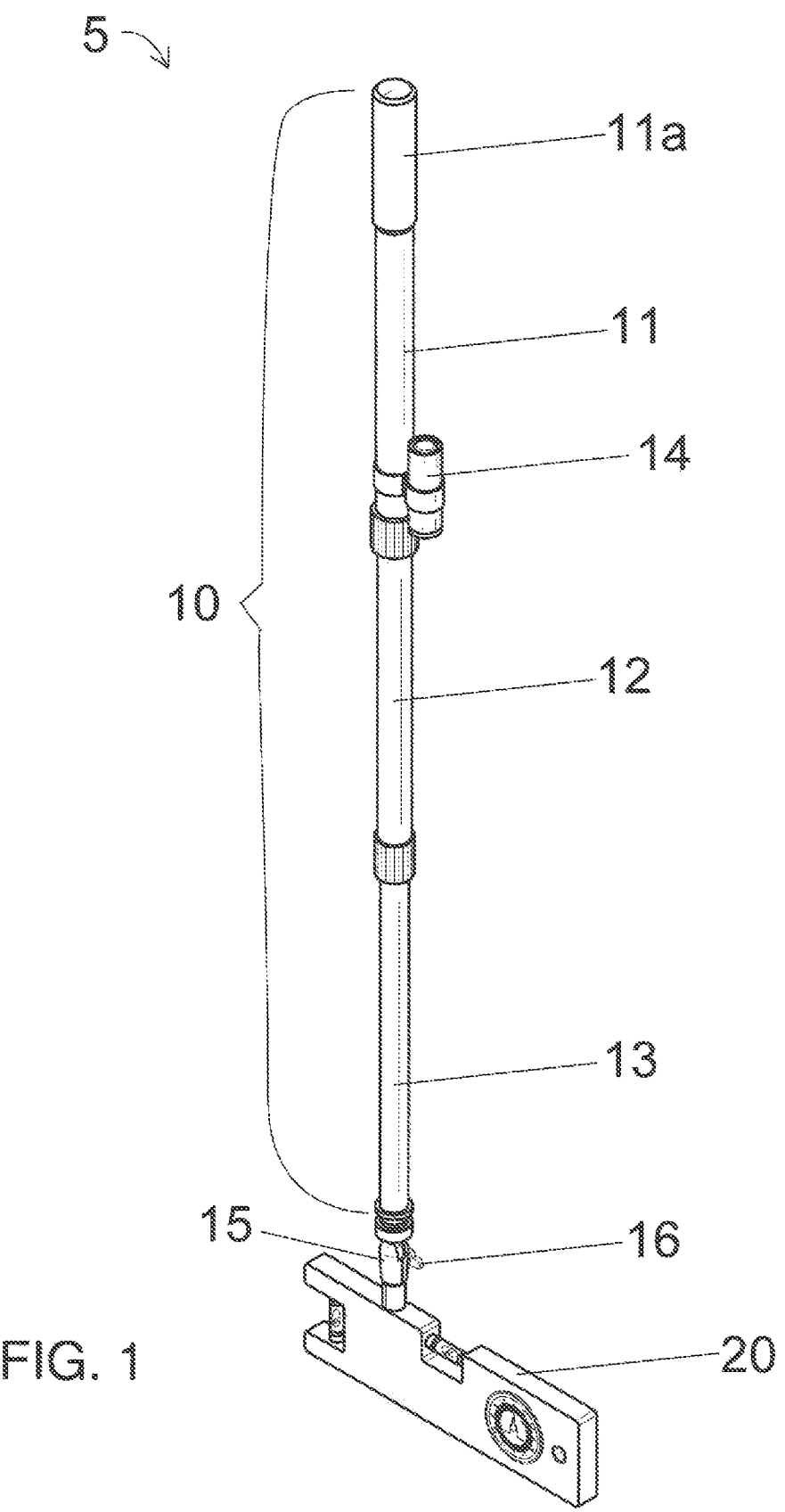
FIG. 1 is a front isometric view of a first exemplary embodiment of a telescoping level device.
Figure 9:
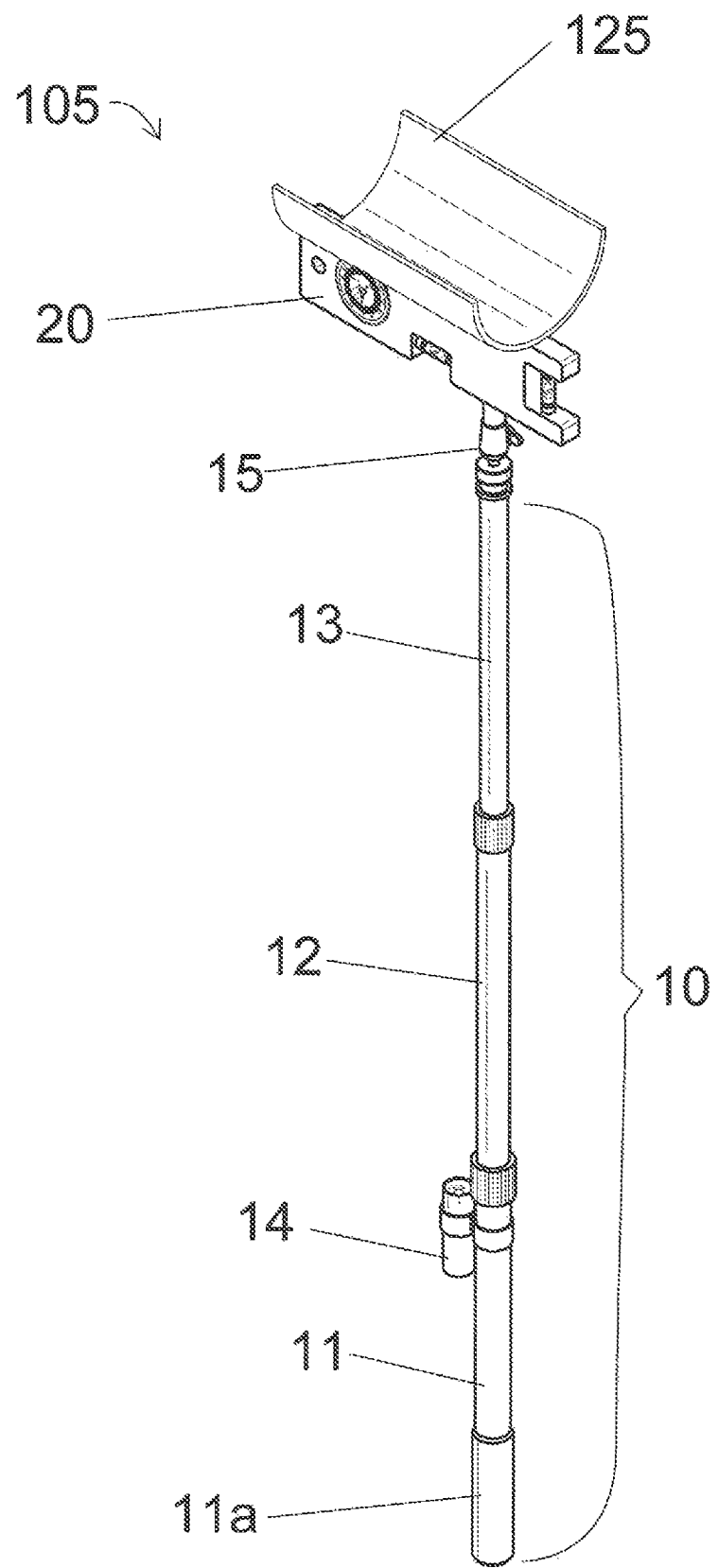
FIG. 9 is a rear isometric view of a second exemplary embodiment of the telescoping level device oriented in a position for measuring overhead.
Figure 11:
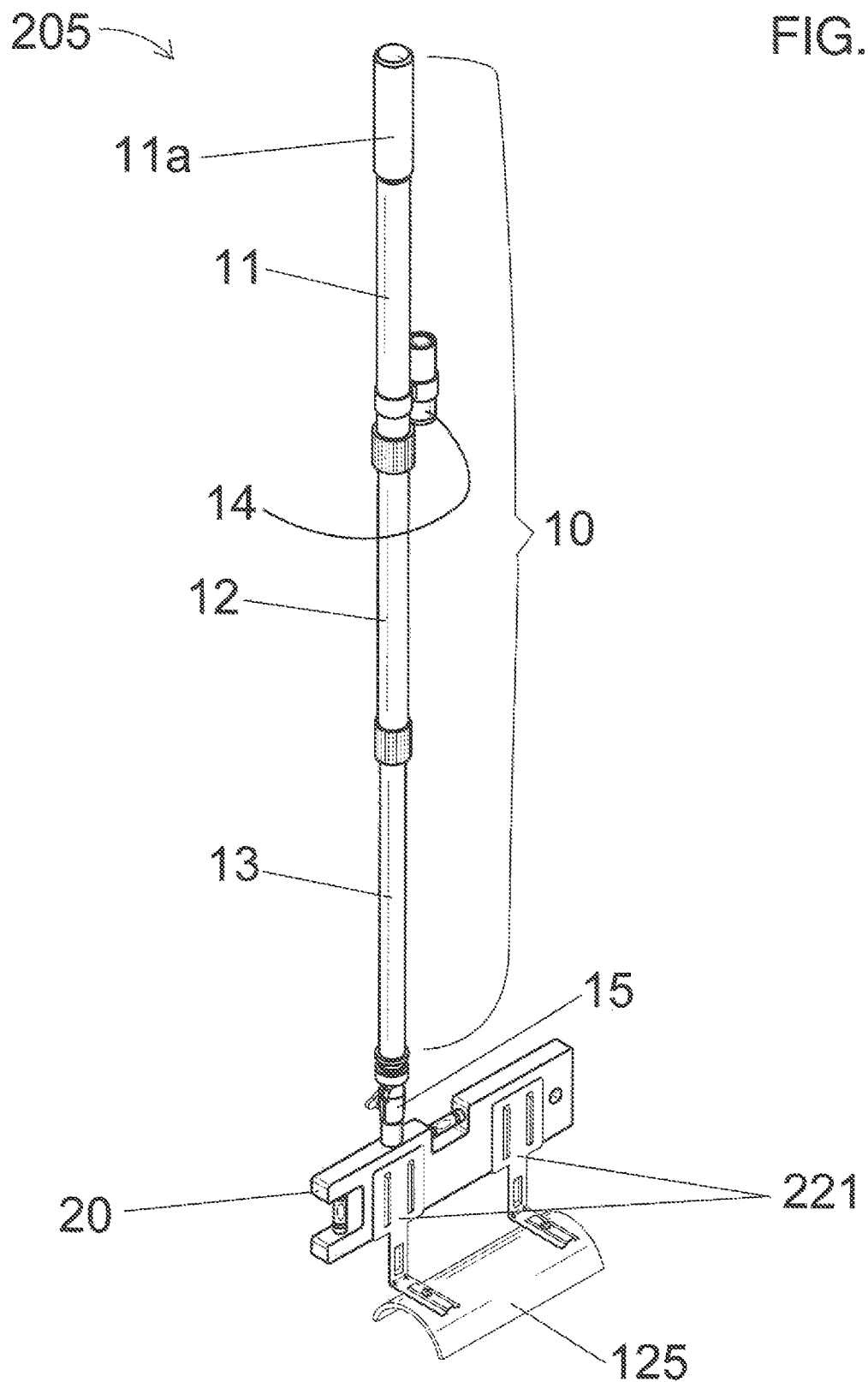
FIG. 11 is an isometric view of a third exemplary embodiment of the telescoping level device.

Each section 11, 12, 13 of the telescoping arm 10 is constructed of a substantially rigid material. The length of the telescoping arm 10 is adjustable and limited to a predetermined range which is dependent upon the number and length of the sections 11, 12, 13, as well as each section's 11, 12, 13 position relative to each other. The telescoping arm 10 described by the embodiments 5, 105, 205 described herein comprise a top section 11, an intermediate section 12, and a bottom section 13 that each have a cylindrical profile, as shown in FIGS. 1, 9, and 11. However, it is anticipated that other cross-sectional shapes may be utilized.

The bottom end of the bottom section 13 attaches to the ball joint 15. The top section 11 provides a handle 11a for gripping the device 5. The handle 11a is comprised of a substantially pliable material that improves the ergonomics of handling the device 5.

The telescoping arm 10 also provides an adjustable light source 14. Often low light conditions within a trench result in poor visibility of objects within the trench. Accordingly, the adjustable light source 14 improves visibility conditions within the trench to assist the user with determining the slope indicated by the level 20 from an elevated position. The adjustable light source 14 may be mounted to any section 11, 12, 13 of the telescoping arm 10. However, when the telescoping arm 10 is fully collapsed, as shown in FIG. 6, the adjustable light source 14 may only be attached to the top section 11. It is further anticipated for the adjustable light source 14 to provide a switch which can be activated by the same hand of the user while holding the handle 5.

Figure 5:
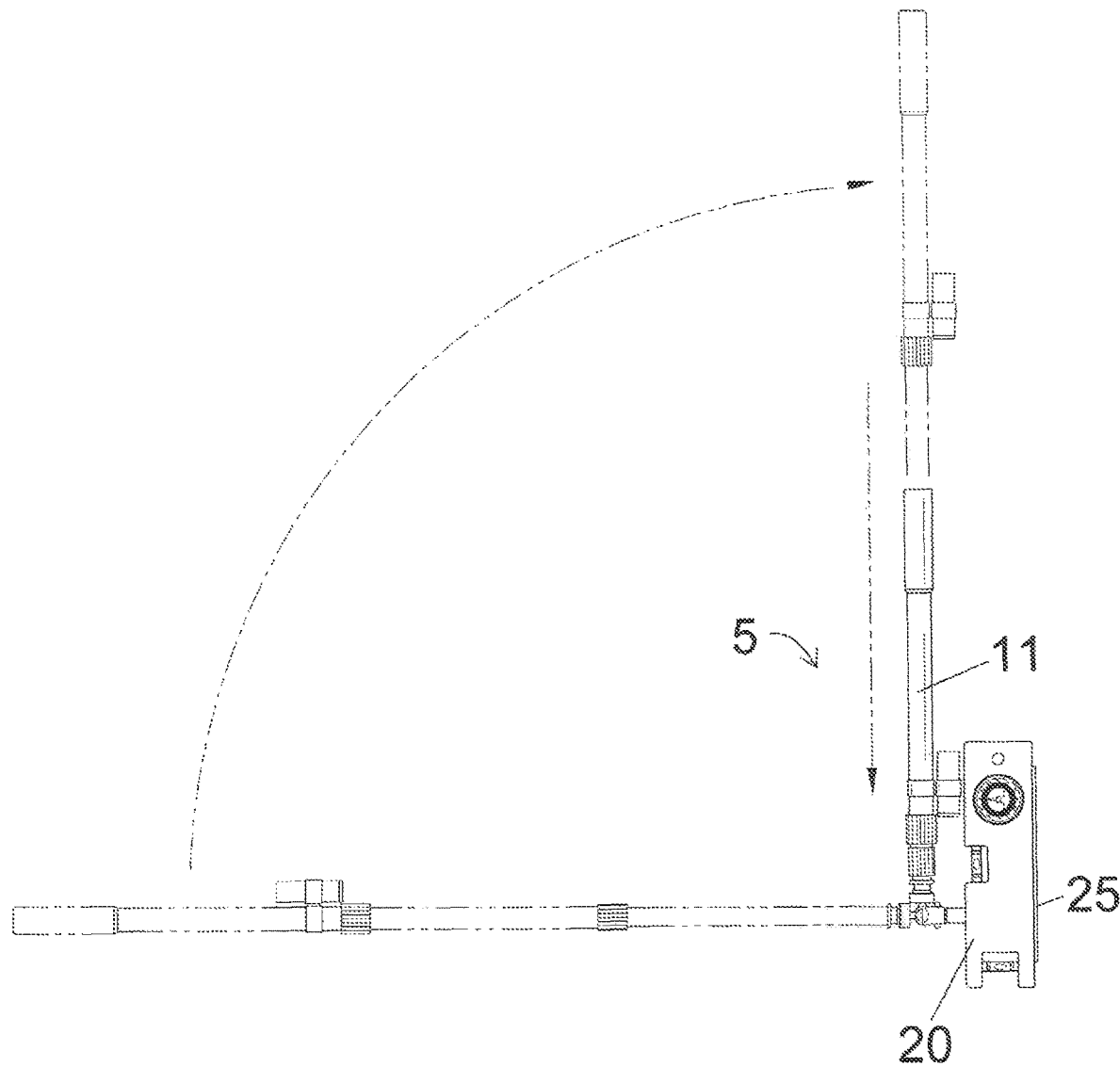
FIG. 5 is a second side view of the first exemplary embodiment of the telescoping level device showing the telescoping arm collapsing and rotating about the ball joint such that the device is transformed into a compacted configuration suitable for storage.

The ball joint 15 enables the articulation of the telescoping arm 10 within a substantially hemispherical volume above the level 20. Accordingly, the ball joint 15 allows the telescoping arm 10 to pivot such that the telescoping arm 10 is substantially parallel with the level 20, as shown in FIG. 5. The device 5 is able to transform into a compact configuration, as shown in FIG. 5, which is advantageous for storing the device 5 when it is not being used. The ball joint 15 provides a ball joint lever 16. The ball joint lever 16 allows the user to incrementally adjust the resistance of movement of the ball joint 15 such that the telescoping arm 10 is or is not able to freely pivot independently, relative to the level 20, respectively.

The level 20 comprises a top side and a bottom side. The level 20 provides a central point which is substantially located at its geometric centroid. The top side is attached to the ball joint 15. It is anticipated that the desired size of the level 20 may vary depending on its intended use. As such, the level 20 is designed to be interchangeable. The level 20 can be quickly detached from the telescoping arm 10 to allow for a larger or smaller level 20 to attach to the telescoping arm 10. In the first exemplary embodiment of the device 5, the level 20 is comprised of a spirit level. However, it will be appreciated by those of ordinary skill in the manufacture and fabrication arts that the invention is not limited to spirit levels and, as such, other types of levels 20 may be utilized with this invention.

Figure 2:
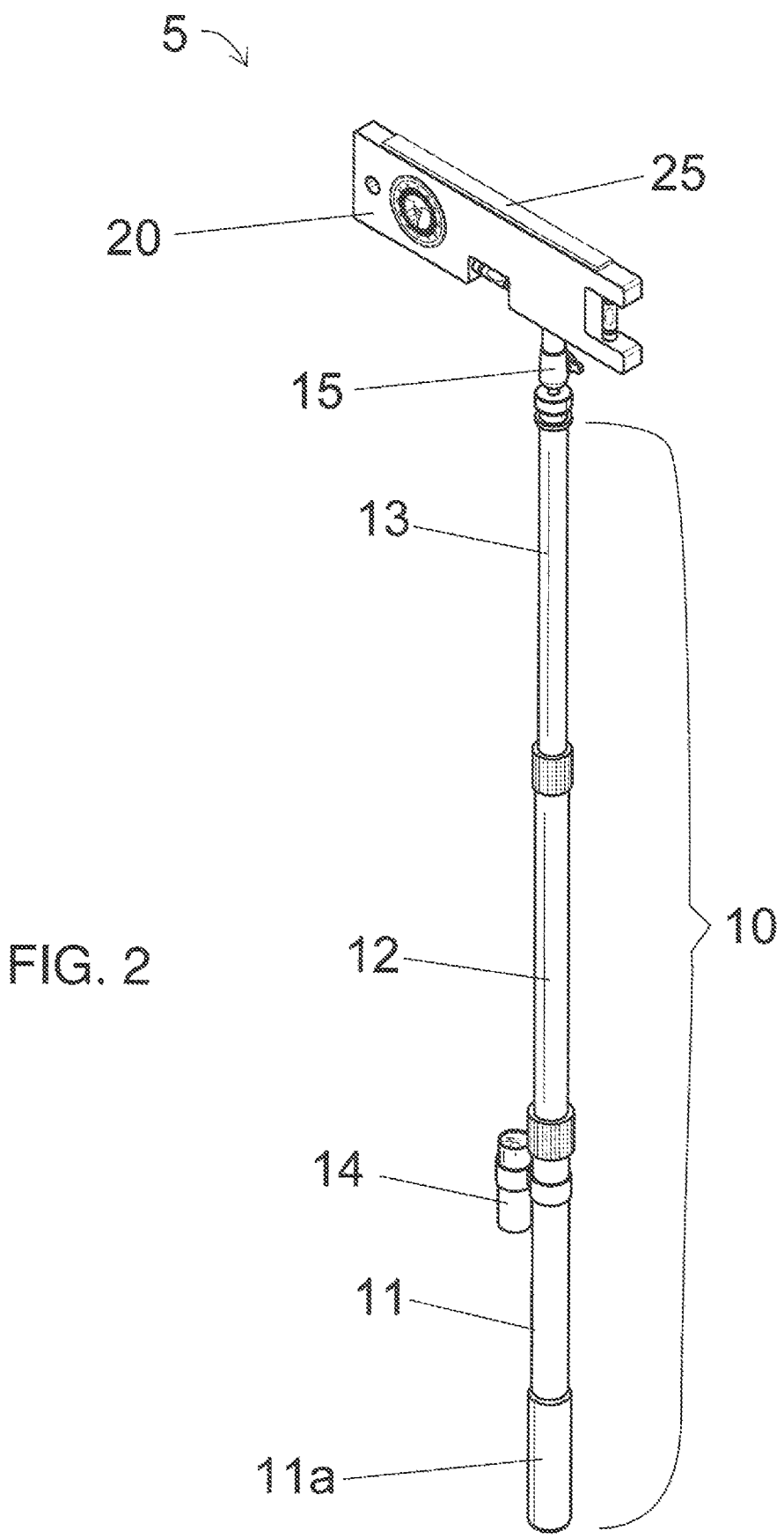
FIG. 2 is a rear isometric view of the first exemplary embodiment of the telescoping level device oriented in a position for measuring overhead.
Figure 3:
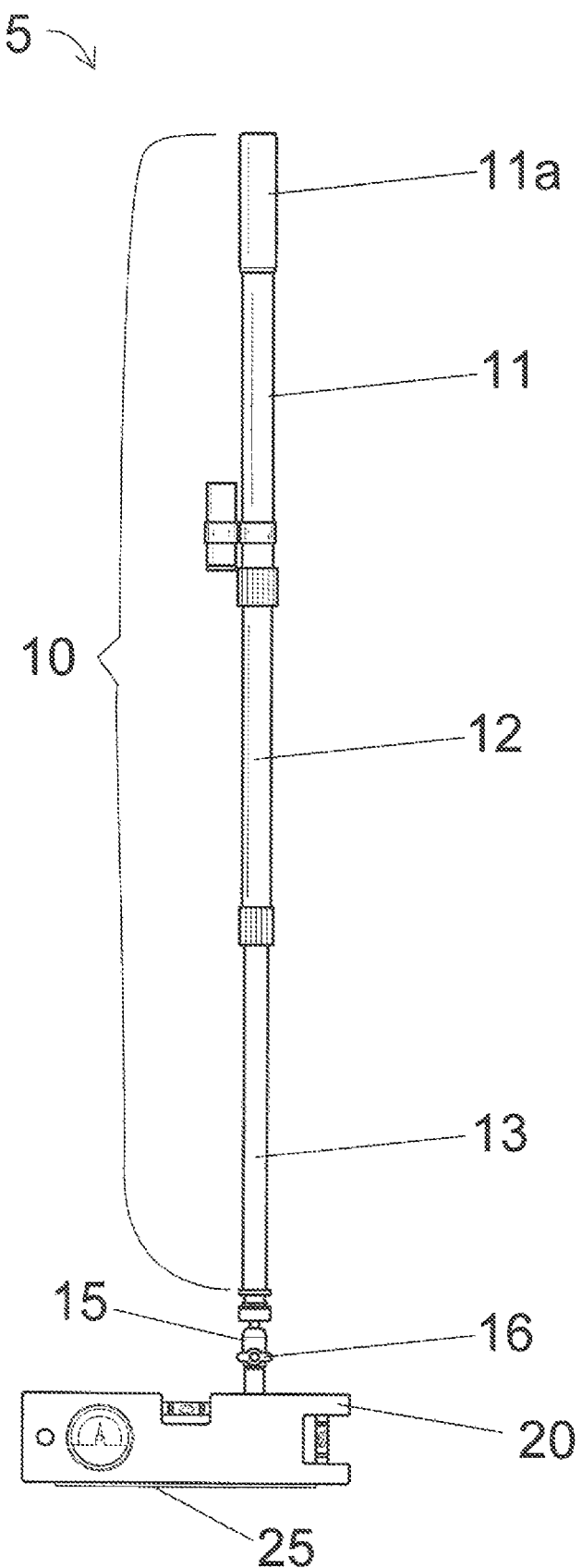
FIG. 3 is a first side view of the first exemplary embodiment of the telescoping level device.
Figure 4:
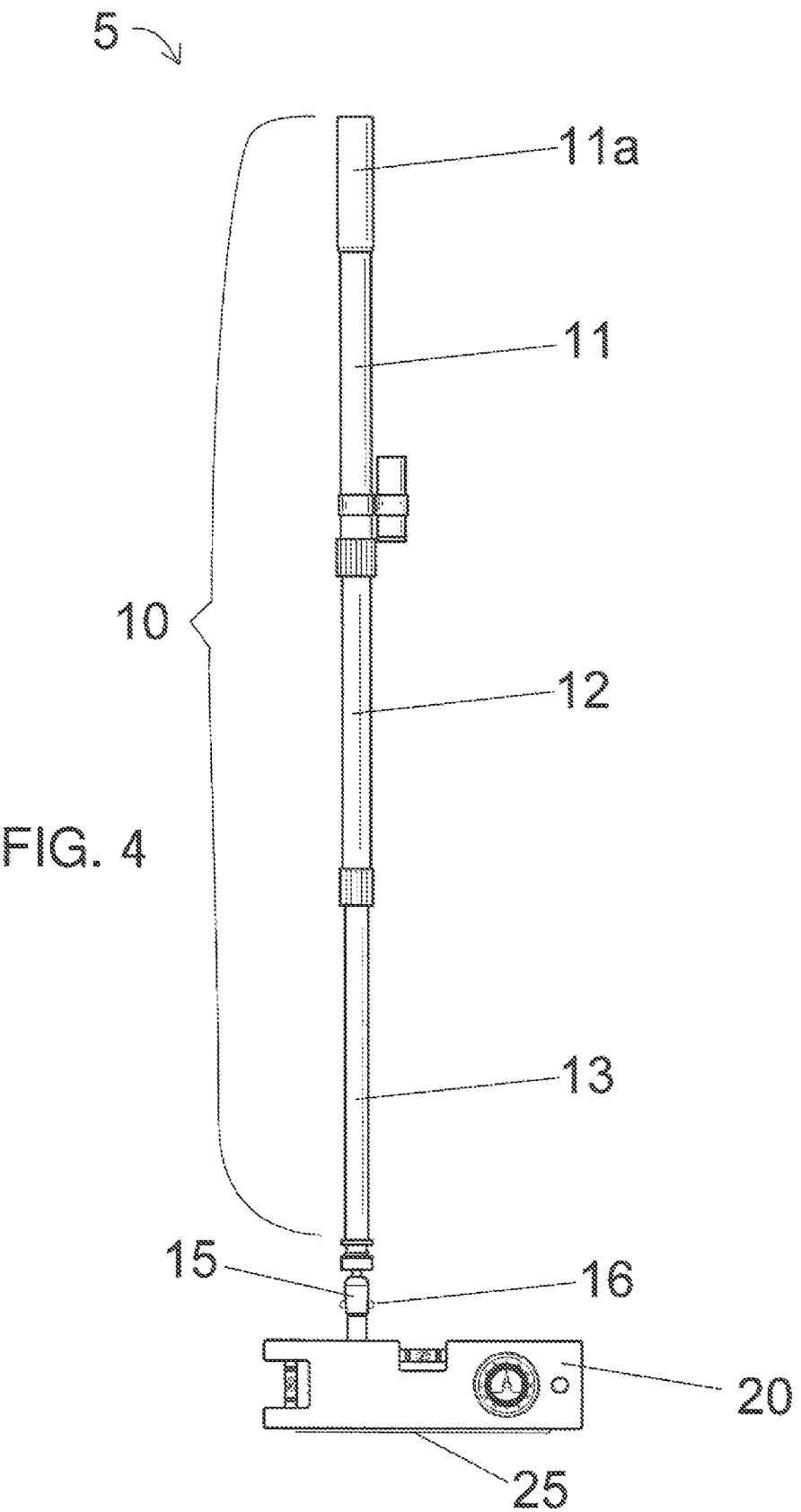
FIG. 4 is a second side view of the first exemplary embodiment of the telescoping level device.

The one or more detachable contactors enable the level 20 to accurately measure the slope of an object or surface by ensuring the level 20 is in direct contact with the object or surface. Each contactor of the one or more contactors provides a central point which is substantially located at its geometric centroid. Each contactor of the one or more contactors is attached to the bottom side of the level 20. In the first exemplary embodiment of the device 5, the contactor is comprised of a shim 25 that is substantially flat, as shown in FIG. 2.

Figure 10:
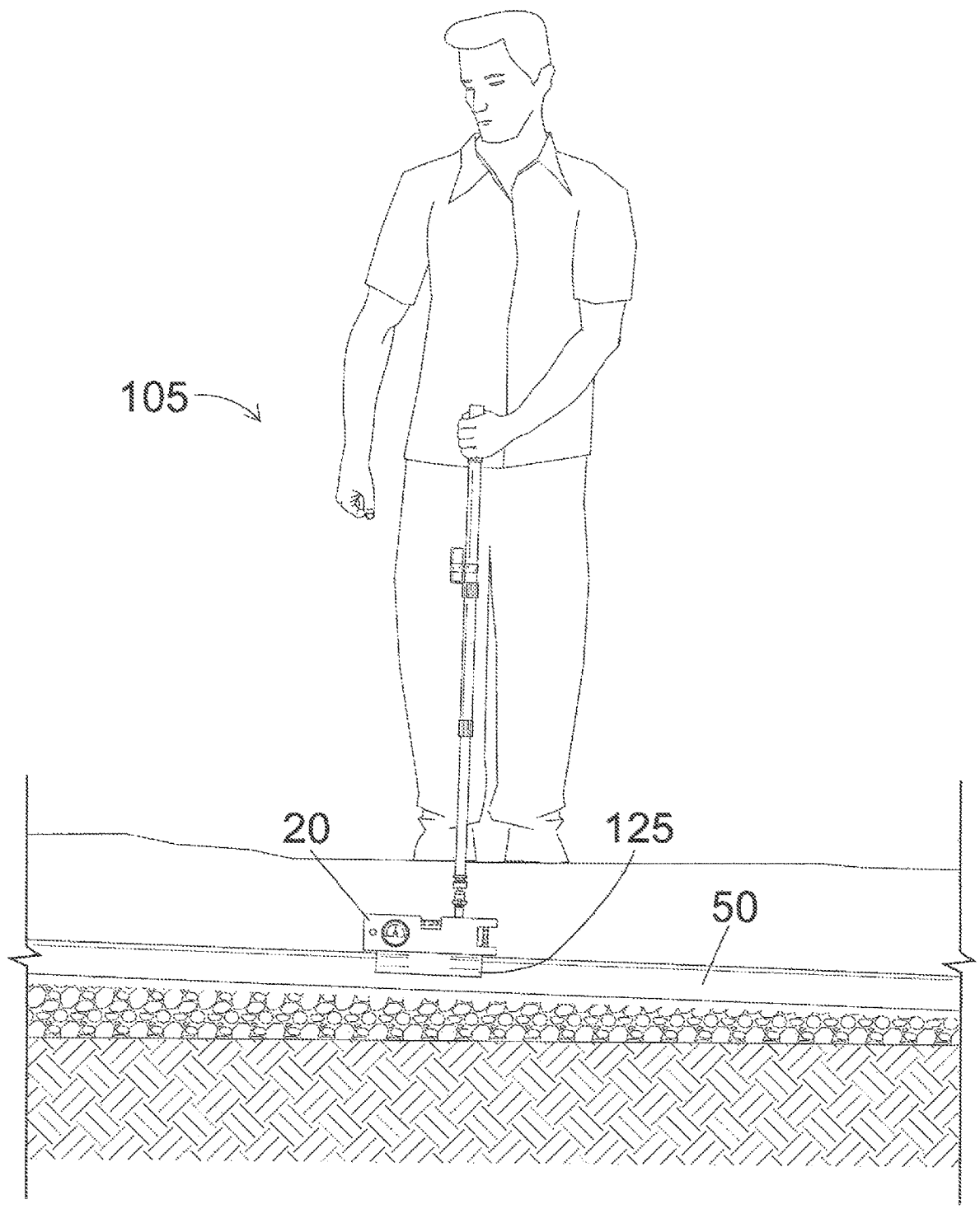
FIG. 10 is a first side in-use view of the second exemplary embodiment of the telescoping level device measuring the slope of a pipe located below grade.

However, in a second exemplary embodiment 105, represented by FIGS. 9 and 10, the contactor is comprised of a pipe saddle 125. The pipe saddle has a semi-circular cross-sectional shape and an interior diameter substantially equal to the exterior diameter of a pipe 50, as shown in FIG. 10. The pipe saddle 125 is preferably positioned such that its longitudinal axis is substantially parallel with the Level 20, as shown in FIG. 9. Accordingly, the pipe saddle 125 provides a friction fit around the pipe 50 when the pipe 50 comprises an exterior diameter that 125 is substantially equal to the pipe saddle's 125 interior diameter. Consequently, different size pipes 50 will require the utilization of different sized pipe saddles 125.

Figure 12:
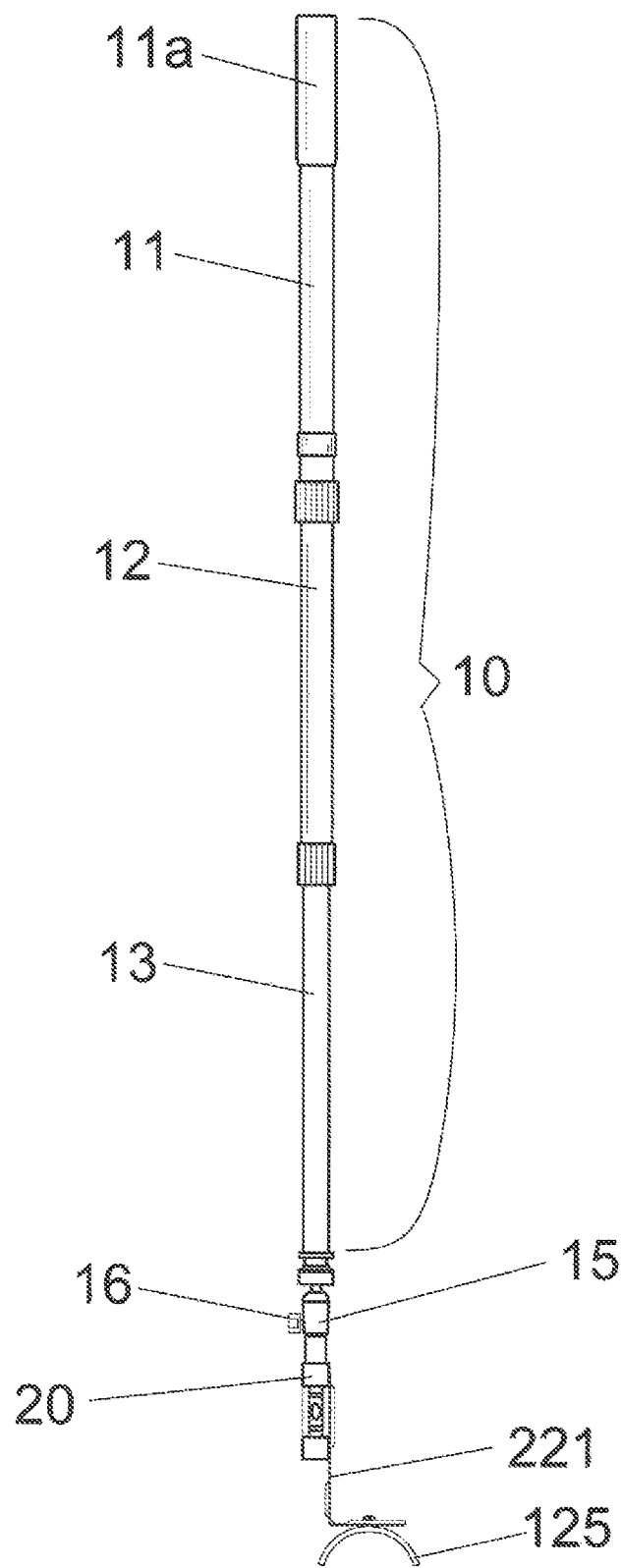
FIG. 12 is a rear view of the third exemplary embodiment of the telescoping level device.

In a third exemplary embodiment 205, as shown in FIGS. 11 and 12, the level 20 provides one or more L-brackets 221, which may be used with a variety of types of contactors, including the shim 25 or pipe saddle 125. Each L-bracket 221 of the one or more L-brackets 221 comprise a vertical leg and a horizontal leg. The vertical leg is substantially orthogonal to the horizontal leg, as shown in FIG. 12. Referring to FIG. 11, the vertical leg attaches to the level 20 and the horizontal leg attaches to the one or more detachable contactors. Referring to FIG. 12, the one or more contactors are attached to the one or more L-brackets 221 such that the central point(s) of the one or more contactors are offset from the central point of the level 20. The one or more L-brackets 221 assist the user in viewing and verifying that the one or more contactors are in proper contact with the object or surface being measured without the level 20 obstructing the line of sight.

While the embodiments of the invention have been disclosed, certain modifications may be made by those skilled in the art to modify the invention without departing from the spirit of the invention.

The invention claimed is:

1. A telescoping level device comprising:
   a. a telescoping arm;
      wherein the telescoping arm comprises a top section, at least one intermediate section, and a bottom section;
      wherein each section of the telescoping arm has the same cross-sectional shape;
      wherein the telescoping arm provides an adjustable light source;

b. a ball joint;
  wherein the ball joint attaches to the bottom end of the bottom section of the telescoping arm;
  wherein the ball joint provides a ball joint lever;
  wherein the ball joint lever is capable of locking and releasing the ball joint;
c. a level;
  wherein the level provides a central point located at its geometric centroid;
  wherein the level comprises a top side and a bottom side;
  wherein the top side of the level is attached to the ball joint;
  wherein the level provides one or more L-brackets;
  wherein each L-bracket comprises a horizontal leg and a vertical leg;
  wherein the horizontal leg and vertical leg of each L-bracket are substantially orthogonal to each other;
  wherein the vertical leg of each L-bracket attaches to the level;
d. one or more contactors;
  wherein each of the one or more contactors provides a central point respectively located at its geometric centroid; and
  wherein the horizontal leg of each L-bracket attaches to one or more contactors such that the central point of the contactors are offset from the central point of the level.

2. The telescoping level device of claim 1, wherein each contactor of the one or more contactors attaches to the bottom side of the level.

3. The telescoping level device of claim 1, wherein the one or more contactors comprises one or more shims.

4. The telescoping level device of claim 1, wherein the one or more contactors comprises one or more pipe saddles.

5. The telescoping level device of claim 4, wherein each pipe saddle of the one or more pipe saddles is of a semi-circular cross-sectional shape.

6. A telescoping level device comprising:
a. a telescoping arm;
  wherein the telescoping arm comprises a top section, at least one intermediate section, and a bottom section;
  wherein each section of the telescoping arm has the same cross-sectional shape;
b. a ball joint;
  wherein the ball joint attaches to the bottom end of the bottom section of the telescoping arm;
  wherein the ball joint provides a ball joint lever;
  wherein the ball joint lever is capable of locking and releasing the ball joint;
c. a level;
  wherein the level provides a central point located at its geometric centroid;
  wherein the level comprises a top side and a bottom side;
  wherein the top side of the level is attached to the ball joint;
  wherein the level provides one or more L-brackets;
  wherein the L-bracket provides a horizontal leg and a vertical leg;
d. one or more contactors;
  wherein each of the one or more contactors provides a central point respectively located at its geometric centroid;
  wherein the horizontal leg of each L-bracket attaches to one or more contactors such that the central point of the contactors are offset from the central point of the level.

7. The telescoping level device of claim 6, wherein the telescoping arm provides an adjustable light source.

8. The telescoping level device of claim 6, wherein the horizontal and vertical legs of each L-bracket are substantially orthogonal to each other.

9. The telescoping level device of claim 6, wherein the one or more contactors comprise one or more shims.

10. The telescoping level device of claim 6, wherein the one or more contactors comprise one or more pipe saddles.

11. The telescoping level device of claim 10, wherein each pipe saddle is of a semi-circular cross-sectional shape.

12. A telescoping level device comprising:
a. a telescoping arm;
  wherein the telescoping arm comprises a top section, at least one intermediate section, and a bottom section;
  wherein each section of the telescoping arm has the same cross-sectional shape;
  wherein the telescoping arm provides an adjustable light source;
b. a ball joint;
  wherein the ball joint attaches to the bottom end of the bottom section of the telescoping arm;
  wherein the ball joint provides a ball joint lever;
  wherein the ball joint lever is capable of locking and releasing the ball joint;
c. a level;
  wherein the level provides a central point located at its geometric centroid;
  wherein the level comprises a top side and a bottom side;
  wherein the top side of the level is attached to the ball joint;
d. one or more contactors;
  wherein each of the one or more contactors provides a central point respectively located at its geometric centroid;
  wherein each contactor of the one or more contactors attaches to the bottom side of the level.

* * * * *